United States Patent
Gagliardi, deceased

[15] 3,653,952
[45] Apr. 4, 1972

[54] DYEABLE RESIN BONDED FIBROUS SUBSTRATES

[72] Inventor: Domenick D. Gagliardi, deceased, late of East Greenwich, R.I. by Frances Dodge Gagliardi, executrix

[73] Assignee: Union Carbide Corporation

[22] Filed: June 16, 1970

[21] Appl. No.: 46,812

Related U.S. Application Data

[60] Division of Ser. No. 804,870, Apr. 8, 1959, Pat. No. 3,545,909, Continuation-in-part of Ser. No. 744,675, June 26, 1958, abandoned.

[52] U.S. Cl..............117/126 GN, 117/126 AB, 117/126 GB, 117/123 D, 117/138.8 E, 117/138.8 F, 117/138.8 N, 117/138.8 UA, 117/138.8 UF, 117/141, 117/142, 117/161 ZA
[51] Int. Cl. .......................C03c 25/02, D06p 1/76
[58] Field of Search ...............117/126 GS, 126 GB, 126 GN, 117/126 AB, 142, 123 D, 138.8 N, 138.8 E, 138.8 F, 138.8 UA, 138.8 UF, 141, 161 ZA

[56] References Cited

UNITED STATES PATENTS

| | | | |
|---|---|---|---|
| 3,427,187 | 2/1969 | Wiggill | 117/118 |
| 3,252,825 | 5/1966 | Marzocchi et al | 117/126 GN |
| 3,249,461 | 5/1966 | Te Grotenhuis | 117/126 GS |
| 3,506,476 | 4/1970 | Marzocchi | 117/126 GS |
| 3,508,950 | 4/1970 | Marzocchi | 117/126 GS |
| 3,252,278 | 5/1966 | Marzocchi et al | 117/126 GN |
| 2,832,754 | 4/1958 | Jex et al. | 117/126 GN |

Primary Examiner—William D. Martin
Assistant Examiner—D. Cohen
Attorney—Paul A. Rose, Aldo John Cozzi, Eugene C. Trautlein and George A. Skoler

[57] ABSTRACT

Fibrous substrate coated with an elastomer, an aminosilicon compound, and a dye or pigment.

4 Claims, No Drawings

DYEABLE RESIN BONDED FIBROUS SUBSTRATES

This application is a divisional application of copending application Ser. No. 804,870, filed Apr. 8, 1959 issued as U.S. Pat. No. 3,545,909, on Dec. 8, 1970, which in turn is a continuation-in-part of application Ser. No. 744,675, filed June 26, 1958, and now abandoned.

This invention relates, in general, to the chemistry of coloring and involves improvements in the dyeing, printing, and pigmenting, i.e., coloration by dyeing or printing with pigments, of a variety of substrate materials including substances of natural organic origin, as well as man-made materials from organic and inorganic sources. More particularly, the invention is concerned with both process and composition of matter improvements resulting, in part, from my discovery that aminoalkyl silicon compounds constitute a unique class of coloring assistants which can be used in conjunction with diverse coloring agents of the dyestuff and pigment types to impart improved coloring and ancillary properties to numerous substrate materials from among the classes enumerated above. In a more specific sense, the invention contemplates the provision of improved coloring processes and certain novel coloring compositions which are based on the unique color-affinity, for pigments of both natural and synthetic origin as well as anionic dyestuffs, or dyestuffs which are rendered anionic in use, that can be imparted - through pretreament with, and/or concurrent use within the coloring media of aminoalkyl silicon compounds - to solid and fibrous substrata including, among others:

1. Materials of normally good substantivity or affinity for conventional coloring agents, such as natural fibrous substrata derived from animal and vegetable fibers including silk, wool, cotton, hemp, jute, etc., and semisynthetic fibers from natural raw materials such as the rayons, casein fibers, etc.; whereby enhanced use of at least some of the existing coloring agents for these materials can be realized, as well as wider use of certain other coloring agents which have heretofore found only limited acceptance in connection with the coloring of these substrata as, for example, pigment dyes and the like; and 2. normally difficulty colorable substrata, including, (A) natural fibrous materials such as leather and asbestos fibers; (B) natural solid substrata including inorganic oxides in pulverulent or laminate forms such as silica, titanium dioxide, quartz, mica, diatomaceous earth, siliceous sands and gravels, etc., and metallic substrata containing similar spontaneously formed insoluble oxide surface layers; (C) semisynthetic fibrous materials including glass fibers and aluminum silicate fibers; (D) synthetic fibrous substrata, monofilaments and continuous yarns from fibers such as the synthetic linear polyamides polyacrylonitriles, polyacrylonitriles modified with vinyl acetate, copolymers of acrylonitrile and vinyl chloride, copolymers of vinyl chloride and vinyl acetate, polymers of tetrafluoroethylene, the polyester fibers and polyethylene fibers; and (E) mixed or blended fibrous substrata produced by spinning combinations of selected natural, semisynthetic and synthetic fibers from among the above-enumerated fibrous materials including, for example, polyacrylonitrile-wool, synthetic linear polyamide-wool, polyacrylonitrile-rayon, viscose rayon-acrylonitrile and vinyl chloride polymer, polyester-cotton, polyester-synthetic linear polyamide etc. (see Fieser and Fieser's Organic Chemistry 3rd Ed. , New York, Reinhold Publishing Corporation 1956 pp. 857–862 for more detailed information relating to the synthetic fibers hereinbefore discussed); whereby enhanced coloration of such substrata can be effected by relatively simple techniques and through use of a great variety of coloring agents which are presently viewed as being substantially non-substantive or non-affinitative towards these materials.

Quite, naturally, the process and compositions of the invention find their most significant applications in the coloring of substrate materials which are classified under group (2) above, namely those materials which are most difficultly colorable from the standpoint of presently known techniques. Among this group of materials, it may be said that the greatest demand for improvement from the standpoint of both necessity and potential use exists with respect to the materials of subgroups (C), (D) and (E), and notably, (I) fibrous glass products from among the known materials of subgroup (C), (II) virtually all of the fully synthetic linear polymeric and copolymeric organic fibers of subgroup (D) whose hydrophobic nature is perhaps their most pronounced characteristic and one of greatest annoyance to the dyer and finisher; and (III) the commonly produced textile blends of synthetic fibers with both natural and other man-made fibers of subgroup (E). Accordingly, the major portion of the technological data presented hereinafter has been directed to the specific applications of the unique coloring assistants of my invention to the coloring of these "problem" substrata.

Significantly, glass fiber products including cloth, mat, roving, yarn, and chopped strands as employed for reinforcing applications, represent the most difficulty colorable materials in use today by the textile and allied industries. That is to say, there are no known coloring agents which exhibit natural affinity towards these materials, but existing coloring techniques are largely based on the use of various types of coloring assistants including protein-type sizes, or resin-bonded pigments. By far the greatest percentage of colored glass fabrics manufactured today are colored by use of print pastes incorporating water- or oil-dispersible pigment colors in combination with water- or oil-soluble synthetic resinous bonding agents. Of course, the coloring effects obtainable under these conditions are relatively limited, whereas the processing costs are substantially higher than those encountered in competitive textile fields.

In contrast to the foregoing, I have found that it is entirely possible to dye and print fiberglass textiles and similar fiberglass substrata with most of the conventional textile dyestuffs now in use, as well as certain newer types of textile dyestuffs, such as the so-called "cellulose fiber reactive" dyes, and to effect similar coloration of such substrata through use of organic and inorganic pigments, either by suitably pretreating the fiberglass with an aminoalkyl silicone coloring assistant, or by the simultaneous application of the dyestuff or pigment and aminoalkyl silicone to the fiberglass from suitable aqueous solutions, dispersions or emulsions, depending on the particular solubility characteristics of the coloring agent and coloring assistant employed. Even more surprising is the fact that these effects can be produced by use of normal plant dyeing and printing equipment, and that no highly unstable compounds, drastic conditions of reaction, or unorthodox solvents are required.

In the field of synthetic organic fibers, the most notable recent advance in coloring techniques is that of pressure dyeing which permits the application of temperatures above the boiling point of water by simply placing the entire dyeing system under pressure, thereby aiding in diffusing the dyes into the fibers, and permitting the production of deeper shades over shorter dyeing cycles. This technique is inherently expensive, however, since it requires the use of special equipment such as pressure vessels and related control apparatus. Other recently proposed dyeing processes for the synthetic organic fibers have advocated use of various solvent systems either with or without an aqueous medium, special cationic dyestuffs, metallic complexes, and the application of ultrasonic waves. Most of these proposals have met with only limited acceptance, however, for the simple reason that they are not directly amenable to existing shop installations and practices.

The problems of the dyer have been further aggravated by the fact that the majority of the synthetic organic fibers are used in blends with natural fibers. The extreme hydrophobic nature of the synthetic components of such blends renders many of the established textile auxiliaries less useful or entirely useless, since they were developed for, and intended for use on natural fibrous substrata within aqueous processing systems. Continued research on this problem has resulted in the development of a great many new auxiliaries or coloring assistants, but these advances have been largely restricted to specialty items, and many are limited to use in connection with the synthetic fiber products of a particular manufacturer. Seemingly, the best indication of the current status of technology with respect to the coloring of synthetics and blended textiles containing synthetic components, may be had by reference to the great many new polymeric and copolymeric fibers which are under development by industry in a continuing effort to produce more readily colorable materials, among other sought-after properties.

In their application to the coloring of the hydrophobic synthetic fibers, the processing techniques of my invention may be employed to promote increased affinity of a particular type of fiber towards a conventional anionic dyestuff applied under presently practiced operating conditions, whereby increased depth of color, or brilliance, or shorter dyeing times can be achieved, for example, or, the aminoalkyl silicone coloring assistants may be employed to render an otherwise normally nonaffinitative fiber amenable to coloration with a selected dyestuff or pigment under conditions usually encountered in the application of the dyestuff or pigment to regular textile substrata. For example, a dispersion or emulsion of a water-insoluble pigment and an aminoalkyl silicone can be applied by conventional pigment printing or dyeing techniques to achieve uniform levelling with blended textiles containing natural and synthetic fibers, or, a cellulose fiber-reactive dyestuff, which normally has absolutely no affinity towards the synthetic fibers, can be employed to produce excellent shades of fast colors by reaction of the dyestuff with the synthetic substrate following a suitable preliminary treatment of the same with an aminoalkyl silicone, or by the simultaneous application of the dyestuff and aminoalkyl silicone from aqueous solutions. Alternatively, the aminoalkyl silicone coloring assistants may be employed to effect spin-dyeing of the synthetic fibers, or they may be incorporated directly into a polymeric spinning mixture to introduce dyeable sites into the fiber during the actual spinning operation.

The processes of the invention may be employed, also, to effect coloration of normally difficultly colorable inorganic oxides and similar inorganic substrata, other than glass fibers by the application thereto of standard textile dyes and pigment colors. Thus, apart from the direct utility for colored substrata of this category as filler materials and the like, it becomes possible to apply conventional organic dyestuffs to white inorganic water-insoluble pigments such as titanium dioxide, silica, calcium carbonate, alumina, aluminum silicate, etc., to produce relatively inexpensive colored pigments, wherein the major portion of the weight of the pigment is constituted by a low-cost inorganic oxide with minor proportions consisting of an aminoalkyl silicone and an organic textile-type dyestuff. Synthetic pigments of this type find direct utility in textile printing and dyeing applications, or as coloring agents in paints, enamels and printing inks, and as colored fillers for plastics and rubbers. Naturally, such organic-modified materials are more compatible with the synthetic rubbers and plastics than are the inorganic fillers, and serve to promote improved adhesion, reduction in mixing times, etc. Analogous aminoalkyl silicone-dyeing procedures can be carried out with inorganic substrata of larger particle sizes such as clays, sands, gravels, and cements for structural uses or for novelty products. In addition, the processes of the invention may be employed to effect coloration of metallic substrata such as tin, iron, aluminum, zinc, manganese, titanium, chromium, etc., apparently by reason of the similar insoluble oxidic surface coatings which form spontaneously on these elemental metallic materials.

As stated hereinbefore, the aminoalkyl silicon coloring assistants may be applied in the form of a pre-treatment to condition the desired substrate for a subsequent coloring operation, i.e., to introduce dyeable sites onto a normally nonaffinitative material, or they may be used to promote dyeability of a substrate from direct admixture with the coloring agent during the normal dyeing or printing operation. The actual choice of procedures in this connection will depend upon a number of factors peculiar to existing plant installations and conventions, and to the particular characteristics of the coloring agent, coloring assistant and substrate involved, including, for example, the mutual solubility characteristics of the coloring agent and coloring assistant, the physical nature and form of the substrate to be colored, the recommended processing techniques normally required for most efficient utilization of the dyestuff or pigment, and the presence or absence of auxiliaries such as levelling agents or coloring catalysts within the coloring medium, among other factors. While most coloring operations can be suitably modified to permit either type of treatment, it is found that one method will usually be superior to the other for each class of coloring agents, substrata, etc. For example, in effecting coloration of fiberglass substrata through use of conventional textile dyestuffs, I find it to be most convenient to apply the aminoalkyl silicon dye assistant to the fiberglass in advance of the actual dyeing process, although good affinity for most dyestuffs of this type can also be obtained by use of the combined treatment. On the other hand, in the application of insoluble pigment colors for dyeing or printing the same type of substrate, it is most convenient to apply the coloring assistant during the dyeing or printing operation from a conventional pigment dispersion or emulsion.

In actual practice of my invention when treating substrate materials with the aminoalkyl silicon coloring assistants prior to the coloring process, it is highly desirable, from an economical and practical standpoint, to effect treatment of the substrate material by a simple immersion operation within a suitable aqueous solution of the aminoalkyl silicone, but it is entirely possible, and practical, to accomplish the requisite loading by spraying or padding techniques or by any other means normally employed in industry. If necessary or desirable, the aminoalkyl silicone can be solubilized beyond its normal solubility in pure aqueous solutions through use of acid, neutral or alkaline solutions, or emulsions of the coloring assistants can be employed with entirely satisfactory results. Enhanced solubilization of the aminoalkyl silicone coloring assistants may also be effected by salt formation, or by direct chemical modification of the base compounds to introduce solubilizing groups, such as by hydroxy ethylation, and the like. The use of solvent systems is particularly desirable when dealing with substrate materials of the highly hydrophobic type in order to avoid "ring-dyed" effects. In point of fact, virtually any solvent system which is substantially non-reactive with the aminoalkyl silicones can be employed to promote more uniform distribution or dispersion of the coloring assistant onto the substrate material. In addition, most of the commercially available wetting agents normally used within the coloring industries can be employed to further promote enhanced dispersion of the silicones.

Among the specific solvents which have been employed with success are included the aliphatic oxygen-containing compounds such as the alkanols and the ether alcohols, such as ethanol, propanol, isopropanol, methoxyethanol, ethoxyethanol, and the like. In addition, monobasic acids such as formic, acetic and propionic acids are excellent solubilizing agents for the aminoalkyl silicones. Included as monobasic acids, such as, lactic acid, gluconic acid, glycolic acid, other hydroxy carboxylic acids are suitable for use as solubilizing agents and provide improved fixing properties. Other carboxylic acids, such as, diglycolic acid, can also be used. Mineral acids may also be employed, as may the standard aromatic hydrocarbon solvents such as benzene, toluene, xylene and the like, but these solubilizing agents are not as preferred for general use as are the simple aqueous systems or the aqueous-alcoholic and monobasic acid-modified aqueous solvent systems. Lastly, the coloring assistants may also be deposited from aqueous alkaline solutions. In actual practice, I have found that an aqueous system comprised of from about 40 to 60 parts water and from about 40 to 60 parts of an organic alcohol such as ethanol or isopropanol, and containing approximately five percent (5%) by volume of a monobasic acid such as acetic acid, provides an excellent medium for solubilizing and dispersing the aminoalkyl silicone coloring assistants onto virtually any substrate material from among the general class described hereinbefore.

The concentration of the aminoalkyl silicone coloring assistants contained within pre-treatment solutions of the foregoing type is found to be relatively non-critical from the standpoint of establishing dyeable sites on the various substrata, including even the most difficultly colorable materials such as fiberglass. Thus, for example, as established by the experimental data presented hereinafter, an increase in solution concentration of from 3 to 9 percent by weight of aminoalkyl silicone solids, representing an increase of from approximately 0.75 to 2.25 percent by weight of the silicone solids actually deposited from the solutions onto a glass cloth substrate, produced little or no change in the coloring effects realized when the glass cloths were subsequently subjected to dyeing operations with various types of conventional textile dyes. In general, I have found that solution concentrations of the aminoalkyl silicone solids ranging from approximately one percent to five percent (1–5%) by weight, are adequate for most coloring applications, assuming, for example, that the percentage wet pick-up on the substrata prior to drying will be within the range of from approximately 10 to 60 percent; depending, of course, on the relative hydrophobic or hydrophilic nature of the various substrate materials. Thus, assuming conditions of minimal wet pick-up at a solution concentration of 5.0 percent, the deposited solids would be of the order of 0.5 percent, whereas under conditions of maximum wet pick-up and a solids concentration in solution of 1.0 percent, the deposited solids would be of an equivalent magnitude. By suitably adjusting the solution concentrations in accordance with the wet pick-up characteristics for a particular substrate undergoing treatment, it is relatively simple to adjust the pre-treatment solution to an optimum concentration for the coloring agent employed. In a similar manner, the concentration of the aminoalkyl silicones can be varied to produce variations in depth of shade and the like. In printing applications, owing to the fact that the concentration of dyestuff as applied to the substrate is many times higher than the average concentration of the dyestuff used in dyeing, it is usually possible to employ extremely dilute concentrations of the aminoalkyl silicone coloring assistants in the pre-treatment of substrate materials intended for printing. These factors are well known to experienced dyers and finishers who must adjust the relative concentrations of most known auxiliaries and coloring assistants to meet the exigencies of many varied dyeing and printing applications, and, accordingly, it is not believed to be necessary to comment further on such variables for purposes of this disclosure.

In the single-bath type of treatment, i.e., the simultaneous application of the aminoalkyl silicone coloring assistant and coloring agent to substrate materials, whether from dye baths, emulsions, or dispersions of insoluble coloring agents of the type of pigment colors and vat dyes, the concentration of the coloring assistant is controlled much much the same manner as for the pre-treatment process described above. Thus, the relative concentration of coloring assistant within the particular coloring medium employed is adjusted to provide for deposition on the substrate of a pre-determined percentage of silicone solids during the dyeing or printing cycle. In general, the deposition of a solids concentration within the range of from approximately 0.25 percent to approximately 3.0 percent will insure adequate colorability of all of the various substrate materials by the different coloring agents which can be employed in the practice of the invention.

In the application of the pre-treatment method for utilizing the coloring assistants of the invention, it is desirable to effect forced drying of the aminoalkyl silicone deposits by heating the substrate material at an elevated temperature after it has been removed from the treatment solution, or otherwise processed to deposit the desired coloring assistant thereon, although simple air-dried substrata have also been colored to produce solid shades of good permanence. It is believed that such drying of the treated substrata at elevated temperatures effectively "cures" the deposited silicone to the substrate, or, more concisely, the deposit is fixed or bonded to the substrate by the heating operation. In this connection, it should be stated that the exact mechanism or mechanisms of the coloring phenomena of my invention are not known, although certain postulations and theories on these effects are advanced hereinafter; nor is the nature of the substrate-silicone reaction, if any, on deposition and curing, entirely understood. It is assumed, however, that the mechanism involves something more than simple surface coating, and that at least limited penetration, absorption, or "depth of reaction", so to speak, occurs between the substrata and coloring assistants. This is evidenced, for example, by the fact that in subsequent coloring operations with synthetic fibrous materials of the types described, some penetration of the fibers by the relatively large dye molecules takes place, since evidence of simple ring-dyeing cannot be detected upon subsequent examination of the fibers, but rather, relatively good distribution of the dyestuff across the fibers is effected under most conditions of operation. For this reason, it is to be understood that the references to "deposits" or "coatings" or "applications" as used herein and in the appended claims, having reference to the substrate-silicone systems, are not to be construed as limitations to a simple surface phenomenon.

Drying and curing of the aminoalkyl silicone deposits can be effected at room temperature over protracted periods or by heating the pre-treated substrate materials at higher temperatures for relatively shorter periods of time. Actually, time and temperature are inversely related in the curing mechanism, such that it is entirely possible to effect "flash" cures within a matter of seconds, provided the particular substrate material will withstand the higher temperatures required for such cures. In actual practice, however, I prefer to operate at curing temperatures within the range of from 200°–350° F., over periods ranging anywhere from a few minutes to one-half hour for substrate materials of pronounced hydrophobicity, whereas proportionately longer drying and curing cycles may be required for the more hydrophilic substrates, and particularly substrata of the pulverulent or finely-divided types, such as organic oxides and the like. In effecting drying of the latter forms of substrate materials, it is usually advantageous to employ a fluid-bed type drier or an equivalent unit capable of preventing undue caking of the materials. When the single-bath type of treatment is practiced, the necessary drying and curing operations are usually effected as an incident to the heating cycles required for the normal dyeing or printing processes, but the heat treatment can be practiced as a separate step following a normal dyeing or printing process.

The coloring agents which can be employed in the practice of my invention include the organic and inorganic pigments, and dyestuffs of the anionic type, i.e., dyes which contain an acidic substituent, or their neutralized equivalents, as well as such dyes containing metal in complex union, and dyes having substrate-reactive groups such as halogen atoms; as distinguished from basic or cationic dyestuffs which contain amino groups and the so-called "dispersed dyes" which are largely insoluble aminoazo or hydroxazo derivatives. The term "anionic dyestuffs" is intended to include those dyestuffs which are customarily rendered anionic in use, as, for example, vat dyestuffs which become anionic when reduced during the dyeing process, and similar "functionally anionic" dyestuffs which might be supplied in a neutralized form for eventual conversion during use. Specific classes of anionic dyestuffs which I have successfully employed for deep dyeing and printing operations in conjunction with the aminoalkyl silicone coloring assistants include, indigoid vats, anthraquinone vats, soluble vat esters, vat acids, direct azo, sulfur dyes, acid wool dyes, premetallized acid, premetallized neutral, direct and developed dyes, naphthols, and cellulose fiber-reactive dyes. Virtually all organic and inorganic pigments can be employed in the practice of my process including, both natural and synthetic inorganic pigments of the types of umber, sienna, ochre, aluminum, etc., and chrome greens, iron blues, iron oxide browns and reds, zinc whites, titanium whites, ultramarine blue, lead chromate yellows, zinc chromate yellows, cadmium reds, carbon blacks, etc.; and natural and synthetic organic pigments of the types of carmine, catechu, tumeric, fustic, logwood, etc., and naphthol yellows, azo reds, lithol reds, azo oranges, indanthrene blues, indanthrene violets, toluidene yellows, phthalocyanine blues, etc. In addition to these conventional pigment colors, I may also employ synthetic pigments produced in accordance with the principles of my invention by use of normal textile dyestuffs on finely-divided inorganic oxide materials such as silica, titanium dioxide, zinc oxide, etc., as explained hereinbefore.

Of course, it is not suggested that the aminoalkyl silicone coloring assistants render all of the various dyestuffs and pigments full equivalents for coloring the various substrata defined hereinbefore, but rather, in the selection of a dyestuff or pigment for a specific coloring application, advantage should be taken of any natural affinity which a particular coloring agent might possess towards a given substrate. Thus, whereas early researchers tended to regard each dyeing theory to be comprehensive and applicable to all fibers, it is now considered axiomatic that this cannot be so, except in a very general sense, but that the precise mechanism of dyeing will vary with the dye and fiber and the respective reactive groups which they contain. For example, in the dyeing of the hydrophobic synthetic fibers such as the polyamides in accordance with the processing techniques of my invention, advantage can be taken of the limited natural affinity for these fibers as exhibited by the acid wool dyes or the naphthols, whereas selected pre-metallized dyes may be utilized for union dyeings of nylon and wool. In a similar manner, acid and vat dyes from among the anionic dyestuffs may be employed to best advantage on the polyacrylonitrile fibers, whereas the acrylonitrile-vinyl copolymers demonstrate some natural affinity towards the acid, metallized, vat and soluble vat dyestuffs, and developed, vat acid and soluble vat dyes may be employed to advantage on polyester fibers. On the other hand, the coloring assistants of the invention are functionally capable of promoting colorability of substrate materials with anionic dyestuffs which are normally totally non-affinitative towards the substrate, as, for example, in the case of figerglass substrata towards direct dyes, or towards the cellulose fiber-reactive dyestuffs, and it is in connection with the vastly simplified coloring procedures which result from these phenomena that my invention should have its greatest effects on present industrial practices. In the same manner, some of the conventional as well as newer pigment colors which possess extreme lightfastness among other desirable properties, exhibit absolutely no affinity towards the synthetic hydrophobic fibers or fiberglass, but it becomes possible through use of the processing techniques of the invention to print and dye such substrata with these highly desirable coloring agents by standard textile coloring techniques. Thus, deeper shades for some of the acrylics and polyester fibers can be obtained through use of improved vat pigments, for example, either by conventional printing or dyeing in conjunction with use of the aminoalkyl silicone coloring assistants, or, conceivably, through application of spin-dyeing procedures with single-bath aminoalkyl silicone-pigment dispersions. As applied to pigment colors, it is probably most accurate from the standpoint of conventional nomenclature, to refer to the aminoalkyl silicone coloring assistants as " pigment binders," but it should be understood that the former terminology is intended to embrace the latter, more restricted usage.

Among the numerous different coloring agents of the dyestuff type which I have utilized to good advantage in practicing the general processing techniques of the invention, the so-called cellulose fiber-reactive dyes of the Procion, Cibacron and Remazol (trademarks) classes are of particularly unique interest, in that these dyestuffs have been especially tailored for use in the dyeing and printing of cellulose substrate materials and have not, to my knowledge, been employed heretofore for any other type of coloring operation. In essence, the Procion and Cibacron and Remazol dyes constitute the prototype members of a potentially enormous class of dyestuffs which should revolutionize many sections of the coloring industry. In general, they are characterized by water-solubility in combination with good levelling and penetration properties, and yet, they are capable of producing dyeings or printings of extremely good wetfastness. In addition, they are completely adaptable to conventional coloring methods, and offer potential means for achieving low-temperature dyeings due to their rapid diffusibility into cellulose fibers, and their rapid rates of reaction. These dyes obtain their permanency on cellulosic fabrics through the formation of co-valent linkages with the cellulose molecules. Chemically, the Procion and Cibacron dyes contain active halogen groups derived from cyanuric halides which have been reacted with the base color molecule. They may be represented by the structural formula:

wherein S represents the dye molecule grouping which produces water-solubility, R is the active coloring component of the molecule, and X is the reactive halogen which promotes combination with alkaline cellulose:

$$OH^-$$

In the case of the Procion dyes, for example, the active halogen group or groups in the dye molecule consist of chlorine atoms which are introduced by reaction of a base dyestuff with cyanuric chloride to yield the following dye-melamine structure:

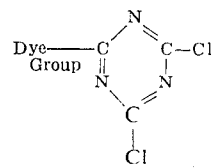

(See British Patent Number 781,930 of August 28, 1957; Journal of the Society of Dyers and Colourists, 73, 237–247 – June 1957).

By suitably controlling the reaction, it is possible to produce derivatives having one or two chlorine atoms for reaction with cellulose hydroxyl groups. Upon application of heat, and/or alkali, the dyes react with cellulose hydroxyl radicals to form cyanurate esters of the dyestuff molecule.

The Remazol Dyes have been described as vinyl-sulfone reactive dyestuffs and have been discussed in an article entitled "Remazol Colors, A Chemically New System of Fiber-Reactive Dyestuffs," by Dr. E. P. Sommer, appearing in the American Dyestuff Reporter Volume 47, No. 24, Dec. 15, 1958 on pages 895–899.

As might be expected, the Procion, Cibacron and Remazol dyes show absolutely no affinity towards any of the non-cellulosic, difficultly colorable substrate materials, such as glass fibers and the like. On the other hand, when these materials are treated with an aminoalkyl silicone coloring assistant in accordance with the general processing techniques of my invention, and whether heat-cured or simply air-dried, they demonstrate a remarkable affinity towards this class of dyestuffs, producing deeply and brilliantly colored materials. In fact, the reaction of the dyes with the aminoalkyl silicone-treated substrates is faster than that obtained with cellulose materials. My investigations with respect to the foregoing phenomenon demonstrate a typical application of the processing techniques of the invention whereby a normally non-affinitative group of substrate materials can be rendered highly affinitative towards an extremely useful and efficient class of dyestuffs, through use of the unique aminoalkyl silicon coloring assistants.

It will be appreciated that much controversy has existed heretofore, and still continues, with respect to the precise mechanism of coloring, even as applied to the very oldest classes of dyestuffs and pigments, and proponents of the solid-solution theory, the mechanical theory, the chemical combination theory, and the theory of physical absorption, among others, have each adduced varying types of evidence in support of their theories. Admittedly, the exact mechanisms of the coloring phenomona realized in accordance with my invention have not been established by conclusive scientific evidence, and without intent to be bound or otherwise restricted beyond the actual beneficial end-results which can be obtained by the practice of the invention, it is believed that the following theories will aid others in pursuit of further improvements, and might well explain the coloring mechanisms which do occur upon use of at least some types of dyestuffs from among the general class described above.

With respect to several classes of cellulose fiber reactive dyes, it is believed that coloration may be produced by chemical reaction of amino groups from the coloring assistants with the chlorine group or groups in the cyanuric chloride residue of the dye molecule, according to the simple mechanism:

SUBSTRATE + $NH_2$-SILICONE → SUBSTRATE-$NH_2$
SUBSTRATE-$NH_2$ + Cl-DYE → SUBSTRATE-NH-DYE + HCl

With the direct, acid, premetallized neutral, premetallized acid, and direct and developed dyes, each of which contains -$SO_3H$ and/or -COOH groups, or alkali salts thereof, it is believed that the dye adsorption involves a simple salt formation or simple precipitation effect, as represented by the mechanism:

SUBSTRATE-$NH_2$ + DYE-$SO_3H$ → SUBSTRATE-$NH_3 SO_3$-DYE

With both the indigoid and anthraquinone types of vat dyes, the mechanism is presumably more complicated, but it is believed that initial adsorption of the dye may involve an ion-exchange effect with the leuco form of the dyestuff after it has been reduced with sodium hydrosulfite, as represented by the scheme:

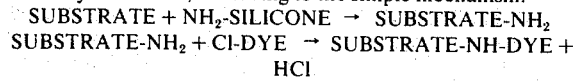

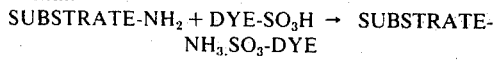

Here, the dye is adsorbed first in the leuco form and then it is oxidized, in situ, on the aminoalkyl silicon treated substrate and deposited as an insoluble pigment;

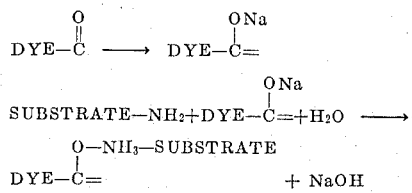

In the case of the soluble vat ester:

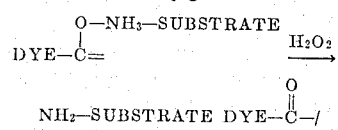

The initial adsorption is believed to be the same as with the direct, acid and other soluble dyes above, i.e., salt formation and then oxidation to the insoluble form on the substrate:

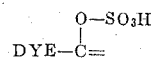

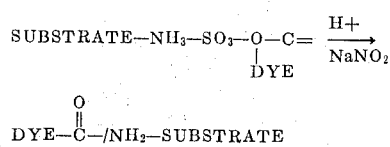

With respect to the sulfur dyes, I believe that the mechanism of coloring involves a combination of physical and chemical factors, but no definite theory has been established to the extent of warranting presentation in this disclosure As a result of a relatively extensive screening of the known aminoalkyl silicones, it has been demonstrated that virtually all stable members of this series can be employed as coloring assistants according to the processing techniques of my invention, although, unexplainably, certain of these compounds do exhibit somewhat superior color affinity for most coloring agents as compared with certain other compounds of the series. It is essential, only, that the coloring assistant contain at least one grouping of the formulation:

(I) $=N-R-Si=$ wherein the divalent R-linkage between the silicon atom and amino nitrogen atom constitutes a hydrocarbon chain, preferably a linear or cyclic hydrocarbon chain of three (3) or more carbon atoms chain-length, on which the amino nitrogen is substituted no closer than the third carbon atom removed from silicon as, for example, a polymethylene chain of three or more carbon atoms, or a para-substituted c-pyridyl radical, and the like. The divalent R-linkage may be unsubstituted or carry additional hydrocarbon substituents along its length. The free valences of the amino nitrogen may both be substituted with hydrogen atoms in primary amine fashion, or as imine (secondary) or nitrile (tertiary) structures carrying organic radicals.

Typical of the organic radicals which may satisfy one or both of the free valences of the amino nitrogen atom are the alkyl radicals such as methyl, ethyl, propyl, cyclohexyl, octyl and the like or the substituted alkyl groups, particularly those which contain carbon, hydrogen and oxygen, as for example, hydroxyalkyl, alkoxyalkyl, polyalkoxyalkyl, hydroxypolyalkoxyalkyl, carboalkoxyalkyl, carboxyalkyl and the like, or those substituted alkyl groups which contain carbon, hydrogen and nitrogen, as for example, cyanoalkyl, aminoalkyl, polyaminoalkyl and the like, or those substituted alkyl groups which contain carbon, hydrogen, nitrogen and oxygen, as for example, N-hydroxyalkyl-aminoalkyl and the like, as well as aryl radicals and/or substituted aryl radicals such as phenyl or pyrrolidyl and pyrrolyl radicals, or fused aromatic ring structures such as naphthalene, and the like. Alternatively, the nitrogen atom may be symmetrically substituted in bis-imine or tris-nitrile fashion by means of other polymethylene-silylidyne groupings [-$(CH_2)_n$Si ]. The free valences on the one or more silicon atoms may be satisfied with mixed alkoxy and alkyl or aryl substituents where monomeric silanes are involved, or with Si-O linkages and alkyl and aryl radicals in the case of aminoalkylpolysiloxanes or copolymers of aminoalkylpolysiloxanes with other polysiloxanes. In essence, therefore, the functional grouping required in the coloring assistants of the invention may be represented in general by the following formula:

(II)

wherein R is a substituted or unsubstituted hydrocarbon group of at least 3 carbon atoms chain-length; R' and R'' represent members selected from the group consisting of hydrogen and organic radicals, preferably aminoalkyl, cyanoalkyl, hydroxyalkyl, carboalkoxyalkyl, carboxyalkyl, and aryl radicals, and the monovalent grouping:

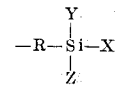

X is a member selected from the group consisting of alkoxy and siloxylidyne radicals [ $\equiv$ Si-O-]; and Y and Z are members selected from the group consisting of alkoxy, alkyl and aryl radicals.

As indicated above, the necessary functional aminoalkyl silicon grouping of the coloring assistants of my invention may be contained within a monomeric aminoalkylalkoxysilane, an aminoalkylpolysiloxane, or a copolymer or simple blend of an aminoalkylpolysiloxane with one or more other siloxanes. It is not essential that these materials be employed in pure form but crude hydrolyzates or aqueous and aqueous-alcoholic solutions of the silicones can be employed directly to introduce the aminoalkyl silicon groups onto the substrate materials or into coloring baths to be used in coloring such substrata.

The aminoalkylalkoxysilanes which can be employed in practicing my invention may be represented in general by the following formula:

(III) 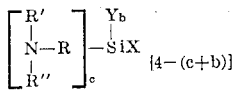

wherein R, R' and R'' have the same meanings as previously assigned above; X is an alkoxy radical; Y is a member selected from the group consisting of alkyl and aryl radicals; (c) is a whole number of from 1 to 2; (b) is zero or a whole number of from 1 to 2; and the sum of (c+b) is not greater than 3.

The following specific silanes are illustrative of some of the aminoalkylsilyl-functional derivatives included among the class of compounds defined within formula III above:

beta-methyl-gamma-aminopropyltriethoxysilane
gamma-aminopropyltriethoxysilane
gamma-aminopropyltripropoxysilane
gamma-aminopropylmethyldiethoxysilane
gamma-aminopropylethyldiethoxysilane
gamma-aminopropylphenyldiethoxysilane
delta-aminobutyltriethoxysilane
delta-aminobutylmethyldiethoxysilane
delta-aminobutylphenyldiethoxysilane
gamma-aminobutyltriethoxysilane
gamma-aminoisobutylmethyldiethoxysilane
gamma-aminobutylmethyldiethoxysilane
N-beta-carbethoxyethyl-gamma-aminopropyltriethoxysilane
N-beta-cyanoethyl-delta-aminobutyltriethoxysilane
N-gamma-triethoxysilylpropyl-pyrrolidine
N-gamma-triethoxysilylpropyl-2,5-dimethylpyrrolidine
N-phenyl-N-methyl-gamma-aminopropyltriethoxysilane
N-phenyl-N-methyl-delta-aminobutyltriethoxysilane
N-methyl-beta-methyl-gamma-aminopropyltriethoxysilane
N-beta-aminoethyl-gamma-aminopropyltrimethoxysilane
N-gamma-aminopropyl-gamma-aminopropyltriethoxysilane
N-gamma-aminopropyl-delta-aminobutylmethyldiethoxysilane
N-octyl-gamma-aminoisobutylmethyldiethoxysilane
N-beta-aminoethyl-gamma-aminoisobutyldiethoxysilane
bis(gamma-triethoxysilylpropyl)imine
bis(beta-methyltriethoxysilylpropyl)imine
N,N-dimethyl-gamma-aminopropyltriethoxysilane
N-naphthyl-N-methyl-gamma-aminopropyltriethoxysilane
N-(furfuryl)-gamma-aminopropyltriethoxysilane, etc.

Aminoalkylalkoxysilanes of the foregoing type and methods for producing compounds of this structure, in general, are described and claimed in U.S. Pat. No. 2,832,754, issued Apr. 29, 1958; U.S. Pat. No. 3,044,982, issued July 17, 1962; and U.S. Pat. No. 3,045,036, issued July 17, 1962. In addition those silanes which contain two amino nitrogen atoms can be prepared by the reaction of a diamine with the appropriate chloroalkylalkoxysilane.

The alkoxysilylalkylamines, -imines, and -nitriles are generally characterized by their ability to form stable solutions with aqueous admixtures of organic compounds, which is a particularly desirable property from the standpoint of existing practices employed in the coloring industries. When placed in aqueous solution, the alkoxy groups hydrolyze at a slow rate such that the silane monomers are eventually converted to water-soluble aminoalkylpolysiloxanes. Aqueous admixtures of such polysiloxanes with water-soluble organic compounds conform to most requirements of stability encountered in the coloring industries.

The aminoalkylpolysiloxanes which can be employed to carry out the desired functional group represented by formula (1) above for purposes of my invention, may be linear, cyclic or cross-linked in nature. The aminoalkylpolysiloxanes of the cross-linked variety are readily produced by the hydrolysis and condensation of the trialkoxy-substituted silylalkylamines, -imines or -nitriles, and can contain small amounts of silicon-bonded hydroxyl groups or silicon-bonded alkoxy groups depending on the conditions under which polymerization is conducted. For example, aminoalkylpolysiloxanes of this type which are essentially free of residual silicon-bonded alkoxy or hydroxyl groups can be produced by the complete hydrolysis and total condensation of an aminoalkyltrialkoxysilane, whereas polymers containing predominant proportions of residual alkoxy groups can be produced by the partial hydrolysis and total condensation of the same starting silane. In a similar manner, polymers containing predominant proportions of residual silicon-bonded hydroxyl groups can be produced by essentially complete hydrolysis and only partial condensation of the trifunctional silane starting materials. Polysiloxanes of the foregoing types may be represented in general by the following unit structural formula:

(IV) 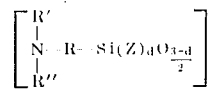

wherein R, R' and R'' have the same meanings as previously assigned above, Z represents hydroxyl and alkoxy groups; and (d) has an average value of from 0 to 2 and preferably from 0 to 1. Typical polymers from among the compounds of this class include gamma-aminopropylpolysiloxane, delta-aminobutylpolysiloxane, etc., and related hydroxy- and alkoxy-containing hydrolyzates and condensates of these polymers.

Aminoalkoxypolysiloxanes of the cyclic and linear varieties may be produced readily by the hydrolysis and condensation of dialkoxyalkyl- or dialkoxyarylsilylalkylamines, -imines and -nitriles. These polymers may be represented in general by the following structural formula:

(V) 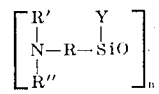

wherein R, R' and R'' have the same meanings as previously assigned above; Y is an alkyl or aryl radical; and (n) is an integer having a value of at least 3, with average values of from 3-7 for the cyclic polysiloxanes, and higher for the linear polysiloxanes. Typical cyclic polymers from among this class include the cyclic tetramers of gamma-aminopropylmethylpolysiloxane and delta-aminobutylmethylpolysiloxane, and the like. The linear polymers may be structures of the type of gamma-aminopropylmethylpolysiloxane, gamma-aminopropylethylpolysiloxane, delta-aminobutylmethylpolysiloxane, gamma-aminobutylmethylpolysiloxane, N-beta-aminoethyl-gamma-aminopropylpolysiloxane, N-beta-aminoethyl-gamma-aminoisobutylmethylpolysiloxane and the like. The linear aminoalkylpolysiloxanes further include alkyl, alkoxy and hydroxyl end-blocked materials which contain from 1 to 3 such groups bonded to the terminal silicon atoms of the molecules comprising the polymeric chains. For example, linear polymers such as monoethoxy end-blocked gamma-aminopropylethylpolysiloxane, methyldiethoxysilyl end-blocked delta-aminobutylmethylpolysiloxane, mono-ethoxydimethylsilyl end-blocked gamma-aminopropylphenylpolysiloxane, and the like, may be employed to impart the desired functional groups to a substrate or coloring bath. These end-blocked polymers may be readily produced by the equilibration of cyclic aminoalkylpolysiloxanes with silicon compounds containing predominant silicon-bonded alkoxy groups, or by the cohydrolysis and condensation of trialkylalkoxysilanes with aminoalkylalkyldiethoxysilanes or aminoalkylaryldiethoxysilanes. The hydroxy end-blocked polymers can be prepared, also, by heating linear or cyclic aminoalkylpolysiloxanes with water.

The copolymeric polysiloxanes which can be employed as coloring assistants in accordance with my invention may contain siloxane units consisting of any of the typical siloxyalkylamine, iimine or -nitrile groups depicted above, in combination with one or more other hydrocarbon-substituted siloxane units of any desired configuration, as represented in general by the formula:

(VI)
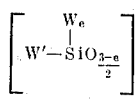

wherein W and W' are hydrocarbon radicals; and ($e$) is an integer having a value of from 0 to 2. These copolymers may be produced by the cohydrolysis and condensation of typical aminoalkylsilanes with other hydrocarbon-substituted silanes, or by the direct equilibration of separate polymeric starting materials. The linear copolymers can also contain chain-terminating or end-blocking groups such as alkyl, hydroxyl and alkoxy radicals. The various polymeric and copolymeric materials of the types discussed hereinbefore, as well as processes for producing these materials, have also been described in substantial detail and claimed in the aforementioned copending applications.

The aminoalkyl silicon coloring assistants may also be employed in the form of their metal coordinated complexes with metallic components of the type of copper, chromium, cobalt, etc. Of particular interest in this connection are the copper complexes of the base resins and monomeric silanes, which may be readily prepared by aqueous reaction of the silicones with water-soluble copper derivatives such as cupric chloride, acetate or sulfate, or water-dispersible or insoluble copper derivatives such as the hydroxide, stearate and the like. The coloring assistants may be pre-complexed with the metal coordinates or reacted in situ to form the coordinated complexes.

While all of the aminoalkyl silicones seemingly are operative for purposes of inducing or improving the color-affinity of the various substrate materials described, I have found that certain compounds and compositions appear to approach a more universal color-acceptance status, while others produce somewhat less pronounced effects when viewed on a universal basis, but may prove to be extremely efficient when used in conjunction with a specific class of dyestuffs or pigments. Thus, one might assume that the degree of coloration is a function of the relative number of amino groups available within the coloring assistants, or that the primary-, secondary- or tertiary-substituted nature of the amino nitrogen atom might alter the color-affinity properties of the assistants, but my investigations have failed to establish these factors to be determinative, per se. For example, some of the silicones having the largest concentration of amino groups produce relatively inferior colorings, when compared with assistants of reduced amino concentration, under some conditions of operation. There is no scientific basis for rationalizing these effects at the present stage of my research, but it is believed that, as continuing research serves to elucidate the mechanism or mechanisms underlying the actual coloring phenomena, it will become possible to "tailor" the coloring assistants for specific coloring processes as well as for universal or general use.

In general, it would appear that for universal color-affinity, the most effective monomeric materials are the difunctional silanes, whereas the most effective polymeric or copolymeric materials are those which are completely condensed or substantially completely condensed from low molecular weight difunctional monomers. The specific compounds and compositions listed below have been found to be particularly efficient as dye assistants of the universal type:

A. Homopolymer of delta-aminobutylmethylpolysiloxane;

B. Copolymeric silicone comprised of 50 percent trimethylsiloxy end-blocked dimethylsiloxane and 50 percent delta-aminobutylmethylsiloxy groups.

C. Copolymeric silicone comprised of gamma-aminopropyltriethoxysilane and amyltriethoxysilane (30 percent resin solids);

D. Homopolymer from gamma-aminopropyltriethoxysilane; and

E. Gamma-aminopropylmethyldiethoxy-silane.

Still other compounds of unique performance characteristics have been identified within the experimental data reported hereinafter.

On the basis of prior experiences with the conventional forms of silicones such as dimethyl oils and the like, one might expect that use of the aminoalkyl silicones as coloring assistants on fibrous substrata such as textiles and leather goods, could promote certain beneficial ancillary properties including, by way of illustration, flame resistance, dimensional stabilization, water repellancy, or crease resistance. On the other hand, it was most unexpected to find that the principal ancillary property resulting from use of the aminoalkyl silicones is that of fixation or insolubilizing of all types of substantive dyestuffs. Thus, in my copending U.S. application Ser. No. 804,882, filed Apr. 8, 1959, now abandoned, I have described and claimed processes which are based on my discovery that the aminoalkyl silicones are excellent dye-fixatives, capable of improving the washfastness of all dyestuffs of the substantive type. Whereas the processes of my aforementioned copending application are directed specifically to the aftertreatment of substantively dyed textiles of the type of cellulosic fabrics and the like, with aminoalkyl silicones to induce or promote fixation of their dye content, the processes of the present invention are intended to embrace similar fixative activities which may result as an incident to a primary coloring operation conducted with substantive dyestuffs through use of the aminoalkyl silicones in their principal capacity as coloring assistants. Of course, it should be apparent that one could effect a primary coloring operation with a substantive dyestuff according to the principles of my present invention, and thereafter promote enhanced fixation of the dyestuff to the substrate material by aftertreatment of the substrate with an aminoalkyl silicone in accordance with the processing techniques of my copending application.

The pre-treatment with and/or concurrent use within coloring media of an aminoalkyl silicone also results in the production of colored substrates having a unique affinity for those elastomeric polymers widely employed as pigment binders and/or textile finishes. Due to this affinity, such polymers are more effectively bonded to colored fibrous substrates produced in accordance with the present invention and hence better serve the original purposes for which they are widely employed. By way of illustration, cotton fabric treated with an aminoalkyl silicone when pigment-colored in a one-step operation employing an acrylic polymer (as a textile finish) in admixture with a coloring pigment possesses improved washfastness, crock resistance, and lightfastness properties as compared to cotton fabric which has been colored by the same procedure, (wherein the acrylic polymer is both the pigment binder and textile finish) but which was not treated with an aminoalkyl silicone. In addition, glass fabric when pigment-colored by conventional means and treated with an acrylic polymer did not possess the excellent crock and crease resistance that characterized pigment-colored glass fabric prepared with the aid of an aminoalkyl silicone coloring assistant and treated with an acrylic polymer.

Elastomeric polymers which appear more effectively employed as finishes when applied to colored substrates prepared in accordance with this invention are, for the most part, polymers having a linear or two-dimensional structure that may contain pendant reactive groups such as carboxy, epoxy, methylolamide, vinylsilyl, and the like. When applied to fibrous substrates and cured, as for example by drying or heating and, with or without a catalyst, as the case may be, such polymers form elastomeric coatings thereon. In some instances such polymers can be blended or reacted with other polymers, as for example, urea-formaldehyde resins and the resultant product cured in the conventional manner. For the most part, such polymers are applied to substrates in the form of a latex and in many instances they are prepared by emulsion polymerization techniques. Typical of such polymers are: natural rubber, synthetic rubber, as for example, a butadiene-acrylonitrile copolymer latex, acrylate polymers, as for example, those prepared by the polymerization of one or more acrylic monomers such as methyl acrylate, ethyl acrylate, acrylic acid, acrylamide, acrylonitrile and the like, the internally plasticized vinyl acetate copolymers and the like polymers.

Without wishing to be bound by any particular theory, it is believed that elastomeric polymers of the above type are more effectively employed in combination with colored fibrous substrates that have been prepared with the aid of an aminoalkyl silicone for the reason that they contain groups that are reactive with those nitrogen-containing groups of the coloring assistant that have not been tied up in the coloring process. Hence, such elastomers become chemically bonded to the colored substrate rather than physically bonded thereto as the case would be when aminoalkyl silicones are not present.

As indicated above, elastomeric polymers can be applied to colored fibrous substrates that have been prepared with the aid of an aminoalkyl silicone after the coloring step is completed or, if desired, when pigments are employed they can be admixed with coloring pigments and the aminoalkyl silicone-treated fibrous substrate padded therewith. I have also found that when pigments are employed as the coloring agent, the pigment, polymer and aminoalkyl silicone coloring assistant can be admixed and the fibrous substrate padded therewith. While the unique affinity of colored substrates for those polymers commonly employed as pigment binders and textile finishes is most pronounced in the production of colored fibrous substrates, this same affinity exists in the treatment with such polymers of other colored substrates prepared by my invention.

In one embodiment of the present invention, the coloring process can be carried out with the aid of a silicone fluid. According to my findings, the use of a silicone fluid with an aminoalkyl silicone coloring assistant and coloring agent in the coloring process provides processing advantages, as for example, improvements in obtaining admixtures of the coloring assistant and coloring agent, better application of the coloring assistant to a substrate and the like. In addition, I have found that the use of a silicone fluid with a coloring assistant and coloring agent in accordance with my teachings provides colored fibrous and sheet substrates having a feel or hand which is similar in many respects to that of the substrates prior to coloring. Thus this embodiment of my invention provides a means to obtain a colored fibrous or sheet material having a relatively soft hand, should the particular application of the colored product require such.

Silicone fluids can be employed in the practice of the invention by a variety of methods. By way of illustration, they can be employed in admixture with the coloring assistant or in admixture with the coloring assistant and one or more additives such as water, solvent and acid, and the resulting mixture applied to a fibrous or sheet substrate prior to treatment with a coloring agent which, if desired, can also contain a silicone fluid in admixture therewith. In addition, the silicone fluid can be admixed with both the coloring assistant and coloring agent together with other additives, as may be desired, and the resulting mixture applied to a substrate. Moreover, the colored substrates produced by the invention, whether or not a silicone fluid was employed in their production, can be advantageously treated with a silicone fluid.

When silicone fluids are employed as an after-treatment for the colored substrates of this invention, they are preferably employed in combination with elastomeric polymer of the type described above as a pigment binder and/or textile finish. Thus, for example, a silicone fluid can be admixed with an acrylate polymer emulsion and the mixture applied to a colored fibrous substrate. If desired, the silicone fluid can be admixed with a coloring pigment and acrylate polymer emulsion and the mixture applied to an aminoalkyl silicone treated fibrous substrate.

The silicone fluids most useful in my coloring process are those polymeric materials known as polysiloxane oils, especially those oils which contain silicon-bonded hydrocarbon substituents or both silicon-bonded hydrocarbon and hydrogen substituents. Typical of such polysiloxane oils are dimethylpolysiloxane, beta-phenylethylpolysiloxane oil, diethylpolysiloxane oil and the like as well as those polysiloxane oils which contain dimethylsiloxane units, in addition to one or more siloxane units of the type which include methylethylsiloxane units, diethylsiloxane units, methylphenylsiloxane units, methylhydrogensiloxane units, beta-phenylethylmethylsiloxane units and the like. I can also employ as silicone fluids those copolymers of linear or branch chain polysiloxanes with polyoxyalkylene polymers.

The amount of silicone fluid that can be employed in the preparation of colored substrates is not narrowly critical and can vary over a wide range. In the preparation of colored fibrous substrates, as for example colored cloth having a relatively soft hand, I have found it convenient to employ a sufficient amount of the fluid in the processing steps as to provide a deposit of such fluid on the cloth of from about one-quarter to as much as four times the amount by weight of aminoalkyl silicone coloring assistant deposited on the cloth. Such can be accomplished by using baths containing an amount by weight of silicone fluid lying in the range of from about one-quarter to as much as four times the amount by weight of the coloring assistant. If the aminoalkyl coloring assistant and silicone fluid are applied in separate baths or if the silicone fluid is used in more than one bath, the total amount of silicone fluid employed in all of the treating baths should, for best results, lie in the same range with respect to the coloring assistant as set forth above for the instance where both are employed in a single admixture.

It is preferred that the silicone fluids useful as an aid in the preparation of colored substrates be employed in the form of an emulsion, as for example a water emulsion containing from about 10 to about 60 percent by weight of a polysiloxane oil. Thus, for example, when a silicone fluid is used in admixture with a coloring assistant, the bath is preferably prepared by forming a mixture containing the desired amount by weight of the coloring assistant one-quarter to four times the amount by weight of the coloring assistant of a silicone emulsion, a small amount of wetting agent with the remainder comprised of water and, if desired, a solubilizing acid.

While I have found it convenient to employ a silicone fluid in amounts of from about one-quarter to as much as four times the amount of coloring assistant, it should be pointed out that greater amounts of the silicone fluid can be employed with the result that greater amounts of the fluid will be deposited on the substrate; however, no advantage commensurate therewith is obtained.

In addition to silicone fluids, I cam employ small amounts of known organic softeners for textiles such as emulsions of long-chain fatty acids, epoxidized soy-bean oil, long-chain quaternary amine compounds, as for example, octadecyltrimethylammonium chloride, octadecyl-ethyleneimine and the like. However, such softeners when employed alone although useful, do not have the over-all beneficial effects that are provided by silicone fluids.

Further improvements in the hand or feel of colored fibrous or sheet substrates, as for example, colored cloth or fabric, prepared with the aid of an aminoalkyl silicone coloring assistant and a pigment color can be obtained by subjecting such colored substrates to a washing procedure and/or to mechanical action, as for example, a pulling or stretching procedure.

The washing procedure can be carried out with water or with an admixture of water and a surface active agent such as soap or synthetic detergent. Accordingly, after a fabric has been subjected to the action of a coloring pigment in accordance with the present invention, the colored fabric is dried and washed. Washing can be accomplished by a variety of methods. By way of illustration, the dried colored fabric can be first rinsed with water, then subjected to the action of an admixture of water and soap and finally rinsed one or more times with water. In certain instances, rinsing with water will be sufficient and in other instances more thorough washing will be necessary.

The mechanical action to which pigmented fabrics can be subjected for the purpose of providing an improved hand can be best accomplished on mechanical apparatus which are capable of stretching or pulling fabric.

It is believed that my invention may be best understood by reference to the following specific examples which illustrate the foregoing principles and procedures as applied to the coloring of various types of substrate materials with different classes of coloring agents and a plurality of typical different aminoalkyl silicone coloring assistants. For the sake of convenience and brevity, the various aminoalkyl silicones which were employed within the experimental work reported in the examples, are consolidated in tabulated form in Table 1, and number-coded for ease of reference in the actual text of the examples.

1. Homopolymer of delta-aminobutylmethylpolysiloxane;

2. Copolymer comprised of 50% trimethylsiloxy endblocked dimethylsiloxane and 50% delta-aminobutylmethylsiloxy groups:

3. delta-Aminobutylmethylpolysiloxane (crude product otherwise comparable to 9 above; made by non-solvent hydrolysis of 30);

EXAMPLE I

Fiberglass Cloth: Cellulose fiber reactive dyes -

Aminoalkyl silicone coloring assistants Nos. 9 and 17 from Table 1 were applied to samples of heat-cleaned glass fabric by padding the fabrics through solutions of the following composition:

| | |
|---|---|
| 5% | Coloring Assistant |
| 5% | Acetic Acid |
| 40% | Isopropanol |
| 40% | Water |

At a wet pick-up of 33 percent, the paddings deposited 1.65 percent silicone on the fabric samples. The wet samples were then dried and cured for ten (10) minutes at a temperature of 300° F.

Dye baths were then prepared with the following three Procion Dyes:

Procion Yellow R
Procion Brilliant Red 2B
Procion Blue 3G

The respective dye baths contained 5 percent by weight of dyestuff and 0.25 percent of a sodium alkyl sulfate wetting agent. The dyes were pasted together in cold water with the wetting agent and then diluted with water at 85°–120° F. Padding of the glass cloth samples with the dye baths was effected at room temperature. One sample of glass cloth from each dyebath was rinsed immediately to ascertain whether the reaction of the aminoalkyl silicone treated glass cloth and Procion Dye was instantaneous or dependent upon a prolonged reaction mechanism. Another sample from each dye bath was dried for 5 minutes at a temperature of 250° F. Both sets of dyed fabrics were rinsed first in water at 95°–105° F., then in boiling water, then in hot water containing the sodium alkyl sulfate wetting agent, and then in a final water rinse at 95°–105b$L$ F. After final drying for 5 minutes at 250° F., the samples were examined for quality and intensity of color, and rated in accordance with the following depth of color scale which is based on a qualitative ranking with ratings 3 to 5 being considered good dyeing:

Numerical 5 = very deep shade
Numerical 4 = deep shade
Numerical 3 = medium shade
Numerical 2 = light shade
Numerical 1 = tinting only
0 = no coloration— sample remains white.

The results of these dyeing are presented in tabulated form in Table II below. By reference to the Table, it will be seen that with all three Procion Dyes, the untreated glass cloth did not dye but remained white. The samples treated with the silicone coloring assistants were deeply and brilliantly colored by all of the dyes, and very little difference could be noted between the instantaneous reaction samples (I.R. in Table) and those which were heated at 250° F. as explained above. With all three dyes it appeared that the deepest coloring was achieved through use of coloring assistant No. 9 from Table I.

The results indicate that the reaction between the cellulose fiber reactive dyes of the class tested and the aminoalkyl silicone treated glass is extremely fast since, on cotton fabrics run as controls in the same dye baths, very little coloring was obtained in the equivalent instantaneous reaction samples, whereas medium shades were obtained in the equivalent controls which were heated at 250° F. The results further indicate that the reactivity rate of this class of dyestuffs is faster with the aminoalkyl silicone treated glass substrata than with the cotton cellulose substrata for which they are intended.

TABLE II

[Pad dyeing of aminoalkyl silicone-treated glass textiles with cellulose fiber reactive dyes]

| Procion Dyestuff | Untreated glass cloth | | Silicone 17 treated glass cloth | | Silicone 9 treated glass cloth | |
|---|---|---|---|---|---|---|
| | I.R. | 5/250° F. | I.R. | 5/250° F. | I.R. | 5/250° F. |
| Yellow R | 0 | 0 | 3 | 3 | 5 | 4 |
| Brilliant Red 2B | 0 | 0 | 4 | 4 | 5 | 5 |
| Blue 3G | 0 | 0 | 3 | 3 | 4 | 4 |

EXAMPLE II

Silicious Sand: Direct, Sulfur and Cellulose Fiber Reactive Dyestuffs -

A sample of ordinary beach sand was treated with coloring assistant No. 9, and thereafter tested for colorability with three different classes of dyes. In this test, the aminoalkyl silicone treatment consisted of the following:

10.0 Parts Beach Sand
5.0 Parts Coloring Assistant No. 9
5.0 Parts Glacial Acetic Acid
0.1 Part of a Sodium Alkyl Sulfate Wetting Agent The foregoing mixture was stirred for 30 minutes at room temperature, filtered and dried at 300° F. for 10 minutes. Samples of the treated sand were then dyed with the following different textile dyestuffs according to the procedures described.

A. Cellulose Fiber Reactive Dyestuffs:

| Dyestuff: | Procion Brilliant Red 2B |
|---|---|
| Dye Bath: | 0.5 g. of dyestuff |
| | 10.0 g. of treated beach sand |
| | 0.1 g. of wetting agent |
| | 99.4 g. of water |

The above mixture was heated with stirring to 160° F. and maintained there for 30 minutes. The dyed beach sand was then filtered and washed repeatedly with hot water until a clear extract was obtained. It was then dried at 110° C.

B. DIRECT DYESTUFF:

| Dyestuff: | Superlitefast Orange LL.LWF (Pr. 628) |
|---|---|
| Dye Bath: | 0.5 g. of dyestuff |
| | 10.0 g. of treated beach sand |
| | 0.5 g. dioctyl sodium sulfosuccinate |
| | 39.0 g. of water |

A procedure equivalent to that used for direct dyeing of cotton fabrics was employed. The dyebath was heated to 160° F. and the treated sand was added thereto. The temperature was elevated to 180° F. in 15 - 20 minutes and 10 cubic centimeters of 10 percent Glauber's Salt were added to aid exhaustion of the dye. The dyeing was continued for another 15 minutes with stirring and then 10 cubic centimeters more of Glauber's Salt solution were added. After another 10 minutes, a final 10 cubic centimeters of Glauber's Salt solution were added, followed by 10 minutes of heating at 180° F. The dyed sand was removed from the dye bath and rinsed in a solution of 10 percent Glauber's Salt at 95° F. It was then rinsed with an anionic surfactant, followed by two cold water rinses and drying.

C. SULFUR DYESTUFF:

| Dyestuff: | Sulfur Red Brown W9R (C.I. 1012) |
|---|---|
| Dye Bath: | 0.5 g. of dyestuff |
| | 10.0 g. of treated beach sand |
| | 0.5 g. of sodium sulfide |
| | 39.0 g. of water |
| | 1.0 g. of $Na_2CO_3$ |
| | 2.0 g. of NaCl |

The dye and sodium sulfide were dispersed in water at room temperature. The sodium carbonate was added and the dye bath raised to 180° F. The treated sand was then added and the bath temperature raised to 195° - 200° F. After 15 minutes, the sodium chloride was added. Dyeing was continued for 45 minutes at 195° - 200° F. The dyed sand was then removed from the dye bath, rinsed in warm water, water and a sodium alkyl sulfate detergent, water alone, and dried.

In the Procion Dyeing, the sample of untreated beach sand used as a control, was absolutely uncolored, whereas the aminoalkyl silicone-treated sand had a deep bright red color. In the direct dyeing, the treated sand was deeply orange colored. With the sulfur dyestuff, it had a dark brown color very much like that of coarse ground coffee. The results of these dyeings are summarized in Table XIX below, on the basis of the color scale of Example I.

TABLE XIX

DYEING OF AMINOALKYL

SILICONE-TREATED

BEACH SAND WITH

TEXTILE DYESTUFFS

| Substrate Sample | Depth of Color Rating | Color |
|---|---|---|
| Untreated (Procion) | 0 | None |
| Treated (Procion) | 5 | Dark Red |
| Treated (Direct) | 4 | Deep Orange |
| Treated (Sulfur) | 5 | Dark Brown |

EXAMPLE III

Fiberglass Cloth: Aqueous Dispersions of water insoluble pigments

The preceding examples have all related to the use of soluble or solubilizable dyestuffs containing acidic groups, as applied following pretreatment of the substrate materials with the coloring assistants of the invention. In an effort to explore use of other coloring agents in conjunction with the processing techniques described hereinbefore, three highly micronized water-insoluble organic pigments were applied to glass cloth substrata.

In this series of colorings, heat-clean fiberglass cloth was treated by padding through a water solution containing 5 percent of coloring assistant No. 31 and 5 percent of acetic acid. After drying and curing at 300° F. for 10 minutes, the treated glass fabrics were padded through water dispersions containing 3 percent of the following pigments:

Microfix Brilliant Green G Paste
Microfix Brilliant Blue 4G Paste
Microfix Red R Paste Glass fabrics which had not been pretreated with the coloring assistant were also run through the same pigment baths for comparison or control purposes. After padding at 30 percent wet pick-up the pigmented samples were dried for 10 minutes at 300° F. After this drying operation, all samples were first rinsed in cold water, then rinsed in hot water at 60° C., then washed at 60° C. with water and a sodium alkyl sulfate detergent, and finally cold water-rinsed and air-dried. During these rinsing operations, all of the samples which had not been pre-treated with the aminoalkyl silicone coloring assistant, lost all coloration and were white, as though not colored at all. The samples which had been pretreated with coloring assistant No. 31 were brilliantly colored with extremely level shades. The latter swatches were subsequently washed for one full cycle in an automatic washer with a commercial soap product at 160° F. All of the original brilliant coloration was retained and the wash water was returned free of pigment coloration.

EXAMPLE IV

Fiberglass Cloth: Use of silicone fluid to improve the hand of fabric colored with the aid of a coloring assistant and an anionic dyestuff and after treatment with acrylate-silicone dispersion Aminoalkyl silicone coloring assistants Nos. 9 and 17 from Table I were applied to samples of heat-cleaned glass fabric by padding the fabrics through a solution of the following composition:

| 5% | Coloring Assistant |
|---|---|
| 5% | Silicone Fluid (silicone emulsion containing approximately 35% by weight of dimethylpolysiloxane) |
| 5% | Acetic Acid |
| 85% | water |

The wet samples were then dried and cured for ten (10) minutes at a temperature of 300° F.

Dye baths were then prepared with the following three (3) Procion Dyes:

Procion Brilliant Red 2B
Procion Yellow R
Procion Blue 3G in accordance with the procedure described in Example I and the treated fabrics colored also in accordance with the procedure described in Example I. After washing and drying, the colored fabrics were compared in color and in hand with those colored fabrics of Example I. With respect to color, both the fabrics treated by the process of this Example and those treated by the process of Example I were of the same brilliant colors. With respect to the hand of the colored fabrics, the hand of the colored fabrics prepared with the aid of coloring assistant No. 17 and with the silicone fluid were considerably softer than those prepared with the same coloring assistant but without the silicone fluid. While the colored fabrics prepared with the aid of coloring assistant No. 9 and without the silicone fluid were of a relatively soft hand, it was found that those prepared with this same coloring assistant and a silicone fluid were even of a softer hand.

The fabrics colored with the aid of coloring assistant No. 17 by the procedure of the present Example (the use of silicone fluid and washing) were then padded through a dispersion containing 10 percent by weight of an acrylate polymer emulsion and 5 percent by weight of a silicone emulsion (water emulsion of polysiloxane oil) and cured. The application of the silicone-acrylate emulsion did not affect the color of the fabrics and did provide some improvement in the hand thereof. Other properties of the after-treated colored fabrics such as light fastness, dry-cleaning fastness of the acrylate-silicone after-finish and crock-resistance were excellent.

EXAMPLE V

Fiberglass Cloth: Pigment coloring of aminoalkyl silicone treated glass fabric

A heat-cleaned glass fabric cloth was treated by padding through a water admixture containing 5 percent of coloring assistant No. 17, 5 percent of acetic acid, a small amount of a wetting agent, and 5 percent of a silicone emulsion. After drying and curing at 300° F. for 10 minutes, the treated glass fabric was padded through a dispersion containing 3 percent by weight of Microfix Brilliant Blue 4G Paste, 5 percent of a silicone emulsion, 10 percent of an acrylate emulsion, and a small amount of a wetting agent. After padding, the glass fabric was dried for 10 minutes, washed with soap and water, and then rinsed in water. The resulting fabric possessed excellent color characteristics and excellent physical properties. The hand of the colored fabric was excellent.

EXAMPLE VI

Fiberglass Cloth: The use of a silicone fluid in the pigment coloring of glass fabric and in the after-treatment with an acrylate dispersion A heat-cleaned glass fabric was treated with the following padding dispersion:

| | |
|---|---|
| 2% | Microfix Brilliant Blue 4G |
| 5% | Coloring Assistant No. 31 |
| 2½% | Acetic Acid |
| 5% | Silicone fluid (an emulsion containing 35% by weight of dimethylpolysiloxane) |

After padding through the above dispersion, the glass fabric was dried for 10 minutes at 300° F., washed with soap and water, rinsed, and dried. The colored fabric was then padded with a dispersion containing 10 percent by weight of an acrylate emulsion and 5 percent by weight of a silicone emulsion, dried, washed, and dried again. The colored fabric so produced possessed excellent color characteristics and physical properties.

EXAMPLE VII

Fiberglass Cloth After-treatment of pigmented-colored glass cloth with acrylate-silicone fluid dispersion A sample of Microfix Brilliant Blue 4G Paste pigmented glass fabric was prepared by the two-step procedure disclosed in Example XXV with the aid of coloring assistant No. 17 and a second sample of glass fabric colored with the same pigment prepared by the one-step procedure of Example XXI and with the aid of coloring assistant No. 17. The two samples of glass fabric were washed and dried as described in Example XXV and were found to be brilliantly colored with extremely level shades.

A dispersion was prepared containing 10 percent by weight of an acrylate emulsion, namely RHOPLEX HA-1, manufactured and sold by the ROHM and HAAS Co. and 5 percent by weight of a silicone emulsion (containing about 35 percent by weight of dimethylpolysiloxane oil) and both colored samples were padded therewith and dried. Treatment of the colored fabrics with the dispersion did not change the color characteristics thereof but did improve their hand, crock resistance and lightfastness. Moreover, when subjected to dry cleaning with perchloroethylene the colored fabrics retained their initial color and upon examination it was found that the acrylate-silicone finish applied thereto was not removed by the dry cleaning operation. This was significant as, according to my knowledge, the heretofore pigmented glass fabrics, even when treated with an after-finish such as an acrylate, was found not only to lose its finish upon dry cleaning, but in addition, to lose some of its color characteristics.

EXAMPLE VIII

Fiberglass Cloth: Lactic acid versus acetic acid as a solubilizing agent

This example shows the surprising benefits obtained by using lactic acid (as well as gluconic acid and diglycolic acid) as a solubilizing agent.

Samples of heat-cleaned fiberglass drapery cloth respectively were padded through dispersions containing 2 weight percent Aurosperse Phthalo Blue (phthalocyanine blue) varying amounts of coloring assistant No. 17 and either lactic acid or acetic acid in the amounts as shown by the table:

| | Dispersion | | | |
|---|---|---|---|---|
| | 1 | 2 | 3 | 4 |
| Coloring assistant (wt. percent) | 1.0 | 2.0 | 3.0 | 5.0 |
| Acetic acid, 100% (wt. percent) | 0.5 | 1.0 | 1.5 | 2.5 |
| | 5 | 6 | 7 | 8 |
| Coloring assistant (wt. percent) | 1.0 | 2.0 | 3.0 | 5.0 |
| Lactic acid, 85% water solution (wt. percent) | 0.5 | 1.0 | 1.5 | 2.5 |

The remainder of the dispersion (i.e., the amount required to make up to 100 percent) was water.

The fiberglass cloth was padded at 20 percent wet pickup. The cloth was dried and cured for three minutes at 400° F. After curing the colored cloth samples were tested by a soap wash test which involves placing 5 inch × 5 inch pieces of the colored cloth in an aqueous 0.5 percent neutral soap solution at 120° F. The colored cloth pieces are stirred in the soap solution for 5 minutes, after which they are rinsed in cold water and dried. Color removal is indicated by inspection of the sample piece and the soap solution. The following table shows the fastness to washing:

| Dispersion | 1 | 2 | 3 | 4 | 5 | 6 | 7 | 8 |
|---|---|---|---|---|---|---|---|---|
| Fastness | 4 | 4 | 4 | 3 | 3 | 2 | 2 | 1 |

Fastness Code: For the purposes of this example only, numbers from 1 to 4 have been assigned to rate the washfastness results. Fastness number 4 indicates substantial color loss from the cloth and substantial color gain by the soap solution. Fastness number 1 indicates no color loss by the cloth and no color gain by the soap solution. Fastness numbers 2 and 3 are proportionate intermediate gradations between fastness numbers 1 and 4.

The soap wash test employed in this example is a particularly severe test and represents a great many normal washings. All of the colored cloth pieces tested exhibited outstanding color retention when compared with fiberglass cloth pigmented by the best heretofore known method. It is to be noted moreover that those cloth pieces colored with the dispersion containing lactic acid exhibited an even greater superiority in color retention than the pieces colored by dispersions containing acetic acid. Colored cloth pieces colored by the process of this example were also tested for color retention after severe cleaning with solvents including those used in dry-cleaning. In these solvent tests all of the colored cloth pieces showed outstanding color retention over fiberglass cloths colored by heretofore known methods. It also was shown that the colored cloth pieces colored with the dispersions containing lactic acid retained color to a far greater degree than the pieces colored by the dispersions containing acetic acid. It is still further to be noted that when lactic acid is employed in the dispersion a lesser amount of coloring assistant is required for giving results equivalent to results obtained from the dispersions containing acetic acid.

When gluconic acid and diglycolic acid, respectively, are employed in place of and in the same amounts as the lactic acid, the same surprising benefits are obtained. In this regard lactic acid, gluconic acid and diglycolic acid function in an additional role other than the role of solubilizing agents. This additional role designates the appropriate classification of such acids as synergists, since the results of employing the coloring assistant and the acid (e.g. lactic, gluconic or diglycolic) are superior to results of employing either one without the other.

I have found many classes of synergists which when used in place of lactic acid in this example provide similar superior color retention after wet or dry-cleaning and improve the effectiveness of the coloring assistant. The following have been found to be synergists: water soluble epoxy compounds, e.g., vinylcyclohexene dioxide, diglycidyl ether of 1,4-butanediol (i.e. 1,4-diglycidoxybutane), the polyglycidyl ethers of glycerol and the like; water soluble amine-formaldehyde compounds and resins, e.g., trimethoxymethylmelamine, dimethylolethylene urea, methylol urea, dimethylol hydantoin, and the like; water soluble salts of di-and tribasic acid, e.g., the alums; methylolstearamide; octadecyl detone dimer; ammonium zirconyl carbonate; melamine-formaldehyde stearamides, e.g., the reaction product of trimethoxymethylmelamine and methylolstearamide; the emulsion copolymers of acrylic resins, e.g., ethylacrylate-glycidyl-methacrylate copolymer, ethylacrylate-itaconic-methyl methacrylate terpolymer, ethyl acrylate-vinyltriethoxysilane copolymer, ethyl acrylate-acrylamide copolymer and the like; ethyleneimine compounds, e.g., triethyleneimine phosphine oxide [$(CH_2CH_2N)_3 P(O)$]$_3$ and the like; alkylolphosphonium halides, e.g., trimethylolphosphonium chloride [$ClP(CH_2OH)_3$].

These synergists, including lactic acid, gluconic acid, diglycolic acid and those previously mentioned, also provide similar superior results when added to dye baths such as those described herein as obtained when added to pigment dispersions such as those described in this example.

The synergist can be added to the pigment dispersion or dye bath along with the coloring assistant or it may be applied to the colored cloth after treatment with the pigment dispersion or dye bath.

In some instances the synergist will spontaneously react with the coloring assistant when added to the dispersion or dye bath simultaneously with said coloring assistant. In such instances it is preferable to apply the synergist at a time subsequent to treatment with the pigment dispersion or dye bath.

Having thus described the subject matter of my invention, what is desired to secure by Letters Patent is:

What is claimed is: 1. A fibrous substrate having a coating thereon comprising an elastomeric polymer resin, an aminoorganosilicon compound in which the amino groups are separated from silicon by at least 3 carbon atoms, and a dye or pigment.

2. The fibrous substrate of claim 1 wherein the substrate is made of glass fibers.

3. The fibrous substrate of claim 2 wherein the aminoorganosilicon compound is an aminoorganosiloxane.

4. The fibrous substrate of claim 1 wherein the resin is an acrylic resin.

* * * * *

UNITED STATES PATENT OFFICE
CERTIFICATE OF CORRECTION

Patent No. 3,653,952    Dated April 4, 1972

Inventor(s) Domenick D. Gagliardi

It is certified that error appears in the above-identified patent and that said Letters Patent are hereby corrected as shown below:

Column 5, line 57, delete the first appearing "much" and insert --in--. Column 9, lines 46-47, in the formula: "$NH_2$- SUBSTRATE DYE-$\overset{O}{\underset{}{C}}$-/" should read --DYE-$\overset{O}{\underset{}{C}}$-/$NH_2$- SUBSTRATE--. Column 10, line 32, in the formula: "[-$(CH_2)_\alpha$Si ]" should read --[-$(CH_2)_\alpha$Si≡]--. Column 17, line 24, in the center of the column insert --Table I--; line 38, delete "9" and insert --1--; line 38, delete "17" and insert --2--; line 71, "105bLf" should read --105°F--. Column 18, in Table 2, delete "17" and insert --2--; in Table 2, delete "9" and insert --1--; line 43, delete "9" and insert --1--; line 47, delete "9" and insert --1--. Column 19, line 70, delete "31" and insert --3--. Column 20, line 14, delete "31" and insert --3--; line 26, delete "9" and insert --1--; line 26, delete "17" and insert --2--; line 53, delete "17" and insert --2--; line 56, delete "9" and insert --1--; line 61, delete "17" and insert --2--. Column 21, line 3, delete "17" and insert --2--; line 22, delete "31" and insert --3--; line 41, delete "17" and insert --2--; line 44, delete "17" and insert --2--; line 76, delete "17" and insert --2--. Column 23, lines 6 and 7, in the formula: "$CH_2CH_2N$" should read --$CH_2CH_2\overset{}{N}$--.

Signed and sealed this 18th day of February 1975.

(SEAL)
Attest:

RUTH C. MASON
Attesting Officer

C. MARSHALL DANN
Commissioner of Patents
and Trademarks